July 2, 1963  E. COWLES ETAL  3,096,036

PEPPER MILLS

Filed Feb. 23, 1961

INVENTORS
EDWIN COWLES
KENNETH H. BOWEN
BY

ATTORNEYS

United States Patent Office 3,096,036
Patented July 2, 1963

3,096,036
PEPPER MILLS
Edwin Cowles, New York, and Kenneth H. Bowen, Auburn, N.Y., assignors, by mesne assignments, to Bo-Mer Manufacturing Corporation, Auburn, N.Y., a corporation of New York
Filed Feb. 23, 1961, Ser. No. 91,077
5 Claims. (Cl. 241—169)

This invention relates to pepper mills and, more particularly, to a pepper mill in which the size of the ground pepper may be conveniently adjusted by the user.

Small manually operated pepper mills in which whole pepper corns may be ground and the freshly ground pepper distributed on the food are known to the art. The more common form of pepper mill is held in one hand while the other hand rotates a crank to grind the pepper.

The form of pepper mill which may be operated while held in one hand is disclosed in Patent 3,055,599 issued September 25, 1962.

An object of the present invention is to provide a pepper mill which can be operated while held in one hand and in which the fineness of grind may be conveniently and easily adjusted by the user.

In accordance with this object, there is provided, in a preferred embodiment of this invention, a pepper mill comprising an elongated case. At one end of the case there is provided a hollow annular ferrule having an internal conical tapered surface, the edge of which defines an aperture extending therethrough coincident with the axis of the casing. The annular ferrule is provided with a threaded external surface threadably engaged with internal threads at the end of the case. An axially extending spindle extends through the case and is provided with an operating plunger at the other end of the case telescopically mounted within an end cap and spring biased to an extended position. The spindle is reciprocable under finger pressure of the user.

The spindle length is selected so that the end of the spindle opposite the plunger is in the plane of the edge defining the aperture through the end ferrule when the plunger is in the extended position. As the plunger is operated, the spindle enters the aperture. Serrations on the end of the spindle entering the aperture are provided to grind the pepper corns fed into engagement with the spindle by the conically tapered surface. To adjust the size of the ground pepper particles, the user need merely rotate the end ferrule providing an adjustable clearance between the aperture defining edge and the end of the spindle.

In such arrangement the fineness of the grind may be conveniently adjusted by the user merely by rotating the end ferrule. Surprisingly, there is also provided a considerable improvement in the consistency of the ground pepper.

Figure 1:
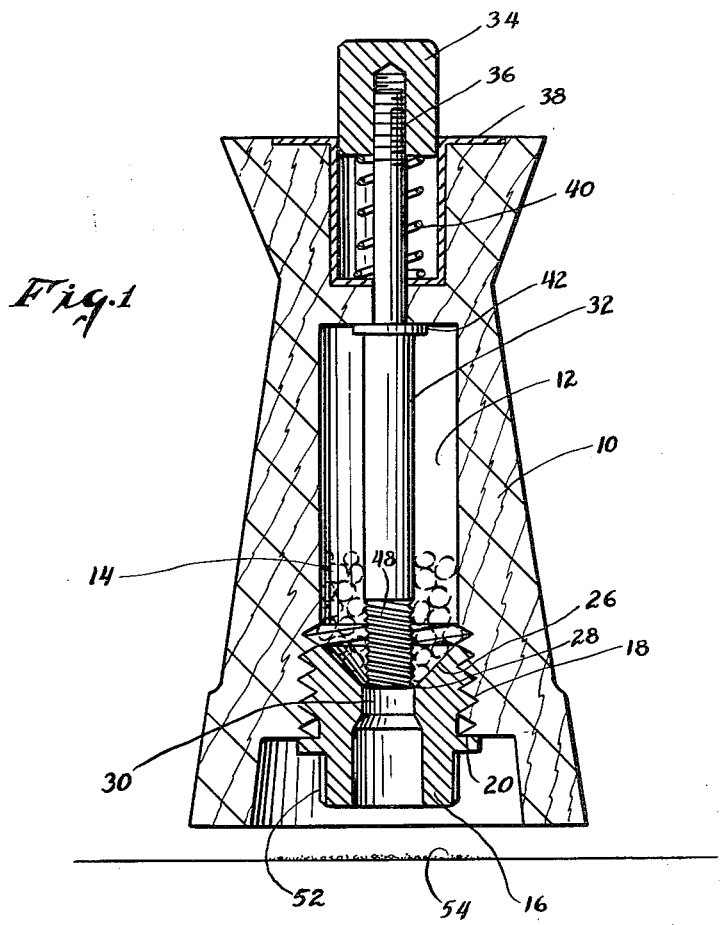
Figure 2:
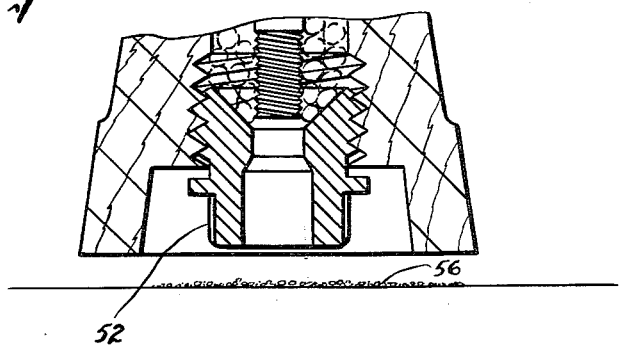

A preferred embodiment of the present invention is illustrated in the accompanying drawing of which:

FIG. 1 is a cross sectioned view of a pepper mill in accordance with the present invention; and FIG. 2 is a cross section of the mill shown in FIG. 1 adjusted for larger particle sizes of ground pepper.

In the figures, there is shown a pepper mill comprising an elongated casing 10 which may be fabricated of wood for esthetic appeal. The casing is provided with a generally cylindrical bore 12 extending axially therethrough to house whole pepper corns 14 or other similar condiments. This casing is provided with an end ferrule 16 threadably engaging internal threads in the casing 10 at 18. A shoulder 20 is provided to define the insertion depth. The internal threads are conveniently cut directly into the wood. However, if the type of wood used does not lend itself to threading or if the casing is metal, a threaded insert may be bonded in place to receive the end ferrule.

The end ferrule is provided with a tapered conical surface 26, the edge 28 of which defines an aperture 30 extending through the end ferrule. The slope of the annular surface urges the pepper corns toward the aperture where they are ground. The inclined angle of the conical surface is preferably between 70° to 95° for the best compromise between operating ease and grinding rate.

Reciprocally contained within the casing is a longitudinally extending spindle 32 operatively engaging an operating plunger 34, as, for example, by threaded engagement therewith over an axially extending threaded portion 36. The operating plunger is housed within the end cap 38 and is biased to the outward position by a spring 40. The limit of the extended position is defined by the co-action of shoulder 42 on spindle 32 and the end of bore 12.

The grinding end of the spindle is opposite the operating plunger and is provided with serrations 48 such as a threaded surface of 30–40 threads/in. extending for a short length on the spindle. The spindle length is selected so that the grinding end of the spindle terminates approximately in the same plane as the edge 28 defining the aperture 30 through the end ferrule.

To grind the pepper corns 14 contained within the casing the user reciprocates the spindle by pressing plunger 34 whereupon the spindle will be reciprocated within aperture 30 and the serrations on the spindle will grind the pepper corns urged into engagement with the spindle serrations by the slope of the conical surface 26.

The user may adjust the size of the particles of ground pepper merely by backing off the end ferrule 16 as shown in FIG. 2. A knurled surface 52 is provided on the end ferrule for convenient grasping by the fingers. It can be easily understood the size of the grind will vary due to the varying gap between the end of the spindle 32 and the edge 28. However, surprisingly and to some extent unexplainably, the regularity of the grind is vastly improved over related constructions. It would seem at first blush that the size of the grind over the entire stroke would be dependent entirely upon the clearance between the serrations 48 and the aperture 30 which remains constant at about $\frac{1}{32}$-in. despite change of position of the end ferrule. However, backing off the end ferrule will change the particle size of the ground pepper from the small particles 54, FIG. 1, to the large particles 56, FIG. 2. In each case the particle size is quite uniform.

It is believed that the pepper corns are ground in a variety of particle sizes during a spindle stroke, and the particles discharged by the mill are determined by the size of the gap between the end of the spindle and the edge 28. Thus, the greatest discharge of ground pepper occurs at the start and end of a stroke, the pepper ground between the serrations and the wall of aperture 30 being relatively slight.

When a short mill, such as a mill approximately 4 inches in height is used, the serrations may extend for the length necessary for a good grinding rate, such as $\frac{3}{4}$-in. However, with large mills, such as a 6-in. mill, it has been found advantageous to restrict the serration length to just slightly more than the stroke, e.g. $\frac{1}{2}$-in., to prevent binding of the spindle.

This invention may be variously modified and embodied within the scope of the subjoined claims.

What is claimed is:

1. A condiment grinding mill comprising an elongated casing having a bore therein, a hollow annular end ferrule closing said bore, said end ferrule having an internal conical surface terminating in an edge defining an aperture through said ferrule, a spindle mounted within said bore and having a diameter less than said aperture, said cylindrical spindle being reciprocable in a stroke during which the spindle is driven from an end position into said aperture, said spindle being provided with a serrated surface for grinding during said stroke, and means for varying the particle size of the ground condiment comprising means for moving said ferrule axially from a position at which the end of said spindle and the aperture defining edge are substantially coincident when the spindle is in said end position to provide a selectable gap between the end of said spindle and said aperture defining edge.

2. A mill in accordance with claim 1 in which said end ferrule is provided with a threaded surface which threadably engages said casing, the axial position of said ferrule being selectable by rotation of said ferrule.

3. A mill in accordance with claim 1 in which said serrations extend for a distance substantially as long as the spindle stroke.

4. A mill in accordance with claim 1 which includes plunger for reciprocating said spindle, said plunger being operable with a finger of the hand holding said mill.

5. A pepper mill comprising an elongated casing having a bore therein, a cylindrical spindle reciprocably housed within said bore and substantially coincident with the axis thereof, an operating plunger coupled to said spindle, means biasing said plunger to an extended position, a hollow annular end ferrule closing said bore, said end ferrule having an internal conical surface terminating in an edge defining an aperture, said aperture being substantially coincident with the axis of said bore, said end ferrule being provided with a threaded external surface threadably engaging said casing, said ferrule having a shoulder thereon to limit the insertion distance, said spindle length being selected so that the end of said spindle is substantially coincident with the plane of said aperture defining edge when said spindle is in the extended position and said ferrule is inserted to the limit in said casing, said spindle being provided with serrations extending from the end at the end ferrule, said serrations being of a diameter less than that of said aperture so as to be reciprocally movable into said aperture.

References Cited in the file of this patent

UNITED STATES PATENTS

| 2,045,058 | Stern | June 23, 1936 |
| 2,679,360 | Arni | May 25, 1954 |
| 2,683,566 | Bentley | July 13, 1954 |

FOREIGN PATENTS

| 250,861 | Switzerland | July 1, 1948 |
| 1,084,682 | France | July 13, 1954 |